United States Patent

[11] 3,601,683

| [72] | Inventor | Harold J. Brown<br>Lorain, Ohio |
|---|---|---|
| [21] | Appl. No. | 16,033 |
| [22] | Filed | Mar. 3, 1970 |
| [45] | Patented | Aug. 24, 1971 |
| [73] | Assignee | Lorain Products Corporation |

[54] ENERGY RECOVERY CIRCUIT FOR INVERTER
7 Claims, 3 Drawing Figs.

[52] U.S. Cl............................................. 321/45 R,
    321/45 C, 321/45 ER
[51] Int. Cl............................................. H02m 7/48
[50] Field of Search............................... 321/45, 45
    C, 45 ER

[56] References Cited
UNITED STATES PATENTS

| 3,311,809 | 3/1967 | Corey et al. .................. | 321/45 C |
| 3,355,654 | 11/1967 | Risberg ........................ | 321/45 ER |
| 3,405,346 | 10/1968 | Krauthamer .................. | 321/45 C |
| 3,417,315 | 12/1968 | Corey............................ | 321/45 C |
| 3,465,233 | 9/1969 | Johnston et al............... | 321/45 C |

FOREIGN PATENTS

| 1,358,647 | 3/1964 | France ...................... | 321/45 C |

*Primary Examiner*—William M. Shoop, Jr.
*Attorney*—John Howard Smith

ABSTRACT: A circuit for preventing the loss of the energy stored in a plurality of commutating capacitors of center tapped source inverters. The charged one of the commutating capacitors discharges in a respective discharge loop when the associated thyristor is turned on. The uncharged one of the commutating capacitors is charged by a current in a respective charging loop, the latter current flowing in response to the flow of discharge current in the discharge loop. An inductor in the charging loop maintains a charging current through the charging one of the commutating capacitors after the discharging one of the commutating capacitors is no longer able to maintain the flow of discharge current in the discharge loop. Means is provided to interrupt the flow of current in the charging loop after the charging one of the commutating capacitors is fully charged.

3,601,683

INVENTOR.
HAROLD J. BROWN 3,601,683

ENERGY RECOVERY CIRCUIT FOR INVERTER

BACKGROUND OF THE INVENTION

The present invention relates to inverter circuits and is directed more particularly to a charge-discharge circuit whereby the energy stored in inverter commutating capacitors, in excess of that required for commutation, may be preserved, thus increasing the efficiency of inverter operation.

Prior to the present invention, the full advantages of inverter power systems have not been realized. One reason is the poor efficiency and resultant high cost of operating such inverter systems.

Another reason is that inverters are limited to operation with loads having a restricted range of power factors. This is because the circuit values necessary to construct an inverter capable of energizing sizable inductive loads have rendered the efficiency of inverter operation with other loads so low as to make the cost of inverter operation prohibitive. As a result, when highly efficient inverter operation was desired, it was necessary to narrowly restrict the power factor and volt-ampere ratings of the loads to be energized by the inverter.

Another difficulty with inverters, prior to the present invention, has arisen from the relatively long time required to commutate the thyristors thereof. This commutating time was fixed by the values of the commutating capacitors and the commutating inductors, the latter, in turn, being fixed by the size and character of the load to be energized by the inverter. Because, at high frequencies, this commutating interval can occupy a substantial portion of the period of the desired AC output, it will be seen that a long commutating interval places a low upper limit on the range of frequencies at which an inverter may operate.

Thus, prior to the present invention, efficiency, power factor and frequency restrictions have limited the applicability of inverter circuits.

SUMMARY OF THE INVENTION

Accordingly, it is an object of the invention to provide circuitry whereby the efficiency, power factor capability and operative frequency range of an inverter may be improved.

Another object of the invention is to provide an inverter having circuitry for increasing the speed of commutation and decreasing the losses associated therewith.

Still another object of the invention is to provide charge-discharge circuitry which so alters the time relationships of commutation that the inductance value of the commutating inductor may be substantially increased without adversely affecting inverter operation.

It is yet another object of the invention to provide charge-discharge circuitry whereby the energy trapped in the commutating inductor during each half-cycle of inverter operation is reduced, thus reducing the sound and vibration associated with the operation of the commutating inductor.

It is another object of the invention to provide an inverter of the center tapped source type including a charge-discharge circuit whereby a substantial portion of the energy stored in one commutating capacitor before commutation may be transferred to the other commutating capacitor during the commutating interval.

More specifically, it is an object of the invention to provide a discharge loop for conducting discharge current from the discharging one of a plurality of commutating capacitors, a charging loop for conducting charging current through the charging one of the commutating capacitor and means for transferring the energy from the former to the latter whereby the charged states of the commutating capacitors may be reversed.

Yet another object of the invention is to provide circuitry of the above character including resonant circuitry whereby the speed and efficiency of the above energy transfer may be maintained at a high level.

Still another object of the invention is to provide charge-discharge circuitry of the above character which can be advantageously applied to existing inverter circuits without modification thereof.

Generally, it is another object of the invention to provide improved circuitry including a center tapped source of energy together with charge-discharge circuitry of the above character.

DESCRIPTION OF THE INVENTION

Figure 1:
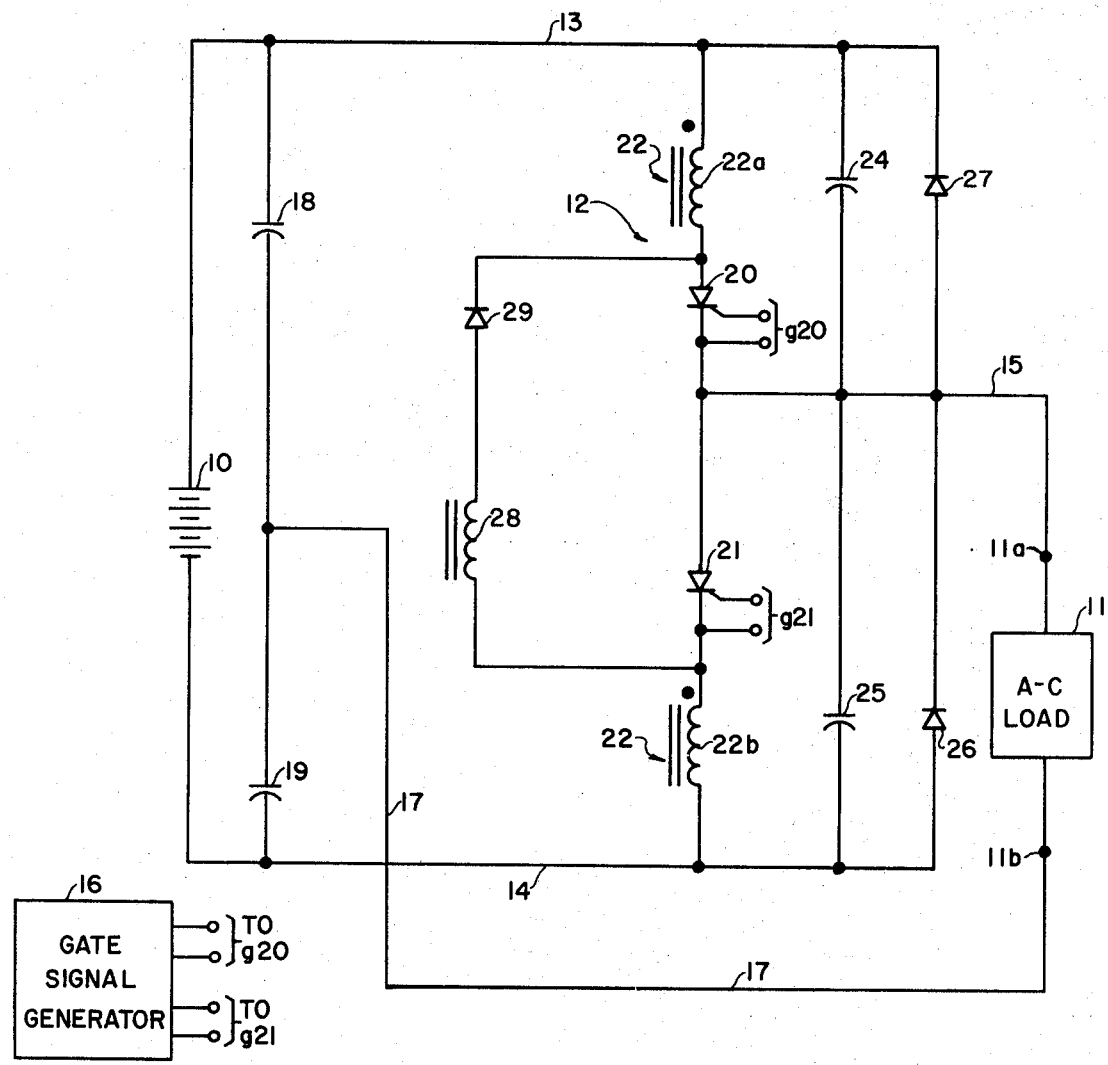
FIG. 1 is a schematic diagram of one circuit embodying the invention.

Referring to FIG. 1 there is shown a DC source 10 for energizing an AC load 11 through a center tapped source inverter 12. Inverter circuit 12 serves to alternately and severally connect one terminal of AC load 11 to positive and negative busses 13 and 14, respectively, while connecting the other terminal of AC load 11 to a neutral bus 17. The latter bus is maintained at the potential of the electrical midpoint between busses 13 and 14 by a capacitance voltage divider including capacitors 18 and 19. Thus, during each positive half cycle of the AC output voltage, AC load 11 is connected between neutral bus 17 and positive bus 13, and during each negative half cycle of the AC output voltage AC load 11 is connected between neutral bus 17 and negative bus 14.

To the end that terminal 11a of AC load 11 may be alternately and severally connected to busses 13 and 14, there are provided respective first and second switch means 20 and 21 which here take the form of thyristors. These thyristors are gated into conduction alternately and severally by gating signals from a suitable gate signal generating circuit 16. Neglecting, for present purposes, the voltage appearing across the winding 22a of a commutating inductor 22, it will be seen that, during the time when thyristor 20 is conducting, the potential of AC bus 15 and, therefore, the potential of load terminal 11a is approximately equal to the potential of positive bus 13. Similarly, neglecting the voltage drop across winding 22b of commutating inductor 22, it will be seen that, during the time when thyristor 21 conducts, the potential of AC bus 15 and, therefore, the potential of load terminal 11a is approximately equal to the potential of negative bus 14. Thus, the alternate and several conduction of thyristors 20 and 21 causes an AC voltage to appear across AC load 11. It will be understood the windings 22a and 22b are on the same core.

As is well known, a conducting thyristor tends to remain conducting unless the current therethrough is reduced to below a value known as the holding current. It will be seen, therefore, that if the desired alternate and several conduction of thyristors 20 and 21 is to be achieved, commutating circuitry capable of terminating the conduction of either thyristor must be provided. In the embodiment shown in FIG. 1 this circuitry includes commutating capacitors 24 and 25 and commutating inductor 22, the latter being provided with the two coupled windings 22a and 22b.

The operation of the above commutating circuitry will now be described. Assuming that thyristor 20 is conducting, the cathode thereof is at approximately the same potential as positive bus 13. As a result, capacitor 24 is substantially uncharged. Because the sum of the voltages across capacitors 24 and 25 must be equal to the voltage across DC source 10, it is apparent that, under the above conditions, capacitor 25 is charged to a potential approximately equal to the voltage of DC source 10.

When, under these conditions, a gate signal is applied to thyristor 21, capacitor 25 discharges in the path including the anode-cathode power circuit of thyristor 21 and winding 22b of commutating conductor 22. As a result, a voltage is induced across the latter winding which is approximately equal to the voltage across capacitor 25. Because of the coupling between windings 22a and 22b this voltage also appears across winding 22a. Since the voltage across winding 22a appears with a polarity which opposes the flow of current through thyristor 20, the latter thyristor is rendered nonconducting.

Without the attributes of the present invention, capacitor 25 would continue to discharge through thyristor 21 and winding 22b after the turnoff of thyristor 20. As a result, the energy which was stored in capacitor 25 after the turnoff of thyristor 20 would be transferred to inductor 22 as capacitor 25 discharged therethrough. Thereafter, the energy stored in inductor 22 by the discharge of capacitor 25 would be dissipated by a current in the loop including winding 22b, a diode 26 and the anode-cathode power circuit of thyristor 21. Thus, in the absence of the present invention, the energy stored in capacitor 25, in excess of that required for commutation, would be dissipated thereby reducing the efficiency of the inverter.

Similarly, with thyristor 21 conducting and a gate signal applied to thyristor 20, capacitor 24 could discharge in the path including winding 22a of inductor 22 and the anode-cathode power circuit of thyristor 20 to turn off thyristor 21. After the turnoff of thyristor 21, capacitor 24 would transfer its remaining stored energy to inductor 22 by discharging through winding 22a. This transferred energy would be later dissipated in the loop including winding 22a, the anode-cathode power circuit of thyristor 20 and a diode 27.

In view of the foregoing, it will be seen that, during each AC cycle, the energy stored in capacitor 24 and capacitor 25, in excess of that required for commutation, would be dissipated without doing useful work.

In accordance with the present invention, the energy stored in each of a plurality of commutating capacitors, in excess of that required for commutation, is preserved by improved circuitry thereby substantially improving the efficiency of the inverter. To the end that this may be accomplished, there is provided an improved arrangement including commutating inductor 22 together with inductance means 28 which here takes the form of a single winding inductor and unidirectional conducting means 29 which is here shown as a diode. As will be described more fully presently, inductor 28 serves as a reservoir for receiving the energy given up by the discharging one of the commutating capacitors and as a source for supplying this energy to another, charging one of the commutating capacitors.

As described previously, when thyristor 20 is conducting, capacitor 24 is substantially uncharged and capacitor 25 is charged to a voltage substantially equal to the voltage of DC source 10. As a result, when a gate signal is applied to thyristor 21, capacitor 25 discharges in a loop including the power circuit of thyristor 21 and winding 22b to turn off thyristor 20. Thereafter capacitor 25 continues to discharge around the above discharge loop and, by means of the transformer action between windings 22a and 22b, produces a current in a charging loop including winding 22a, capacitor 24, the anode-cathode power circuit of thyristor 21, inductor 28 and diode 29. The latter current thus bypasses nonconducting thyristor 20 and results in the transfer of energy to capacitor 24. Thus, it will be seen that the energy given up by capacitor 25 as the latter discharges in the above described discharge loop is received by capacitor 24 as the latter is charged by a current in the above described charging loop.

As the voltage across capacitor 25 decreases, the latter capacitor loses its ability to produce an increasing current in inductor 28. At this point, the polarity of the voltage across inductor 28 reverses at this inductor attempts to maintain the maximum current therethrough, that is, the maximum current in the charging loop. Under these conditions, inductor 28 transfers to capacitor 24 the energy which it received from capacitor 25. Thereafter, as the current through inductor 28 drops to zero, the polarity of the voltage thereacross again reverses to reverse bias diode 29 and thereby prevent capacitor 24 from discharging back into inductor 28. Thus, the energy which was stored in capacitor 25 during the conduction of thyristor 20 is transferred to capacitor 24 by series resonant action during the conduction of thyristor 21.

Similarly, when thyristor 21 is conducting and a gate signal is applied to thyristor 20, capacitor 24 discharges in a discharge loop including winding 22a and thyristor 20 to turn off thyristor 21. Under these conditions, capacitor 24, by transformer action, transfers energy to a charging loop including winding 22b, inductor 28, diode 29, thyristor 20 and capacitor 25. Thus, the energy which was stored in capacitor 24 during the conduction of thyristor 21 is transferred to capacitor 25 by series resonant action during the conduction of thyristor 20.

In view of the foregoing, it will be seen that the energy stored in the charged commutating capacitor, in excess of that required therein for commutation, is transferred to the uncharged commutating capacitor by means of a charging current established in an inductor by the charged commutating capacitor. In this manner capacitors 24 and 25 need draw from DC source 10 only the energy required for commutation and energy sufficient to replace the losses in the discharging and charging loops. Since this energy is only a small fraction of that which would be drawn from DC source 10 if the energy stored in capacitors 24 and 25 were dissipated after each commutating event, it will be seen that the efficiency of inverter 12 is greatly improved by the provision of the charge-discharge circuit of the invention.

In addition to preventing the loss of the energy stored in capacitors 24 and 25 after each commutating event, inductor 28 and diode 29 also increase the speed at which the energy stored in capacitors 24 and 25 may be removed, this removal being necessary before the polarity of the voltage across AC load 11 reverses. This increase in speed occurs because, after the turnoff of thyristor 20, inductor 28 and diode 29, serve as part of a low impedance charging loop into which capacitor 25 may release its stored energy. In the absence of inductor 28 and diode 29, capacitor 25 would have to discharge through the high impedance which winding 22b of inductor 22 would present if winding 22a of inductor 22 had only nonconducting thyristor 20 and nonconducting diode 27 connected thereacross. Since the discharge time for the commutating capacitors is thus greatly reduced, it will be seen that commutation may be allowed to occur more frequently without having the commutation interval occupy a significant portion of the period of the AC output waveform. This allows an inverter designed for operation at one frequency to operate at a higher frequency without reducing the value of inductor 22; a reduction of this type was previously thought necessary to increase the frequency of inverter operation.

Furthermore, because the energy stored in capacitors 24 and 25, in excess of that required for commutation, is not lost, it will be seen that capacitors 24 and 25 can be made as large as the volt-ampere and power factor requirements of AC load 11 require without a significant loss of efficiency when the inverter is used with other types of loads. Thus, the charge-discharge circuitry of the invention allows the construction of an inverter with a higher efficiency, a better power factor characteristic and a wider operative frequency range than that possible heretofore.

Figure 2:
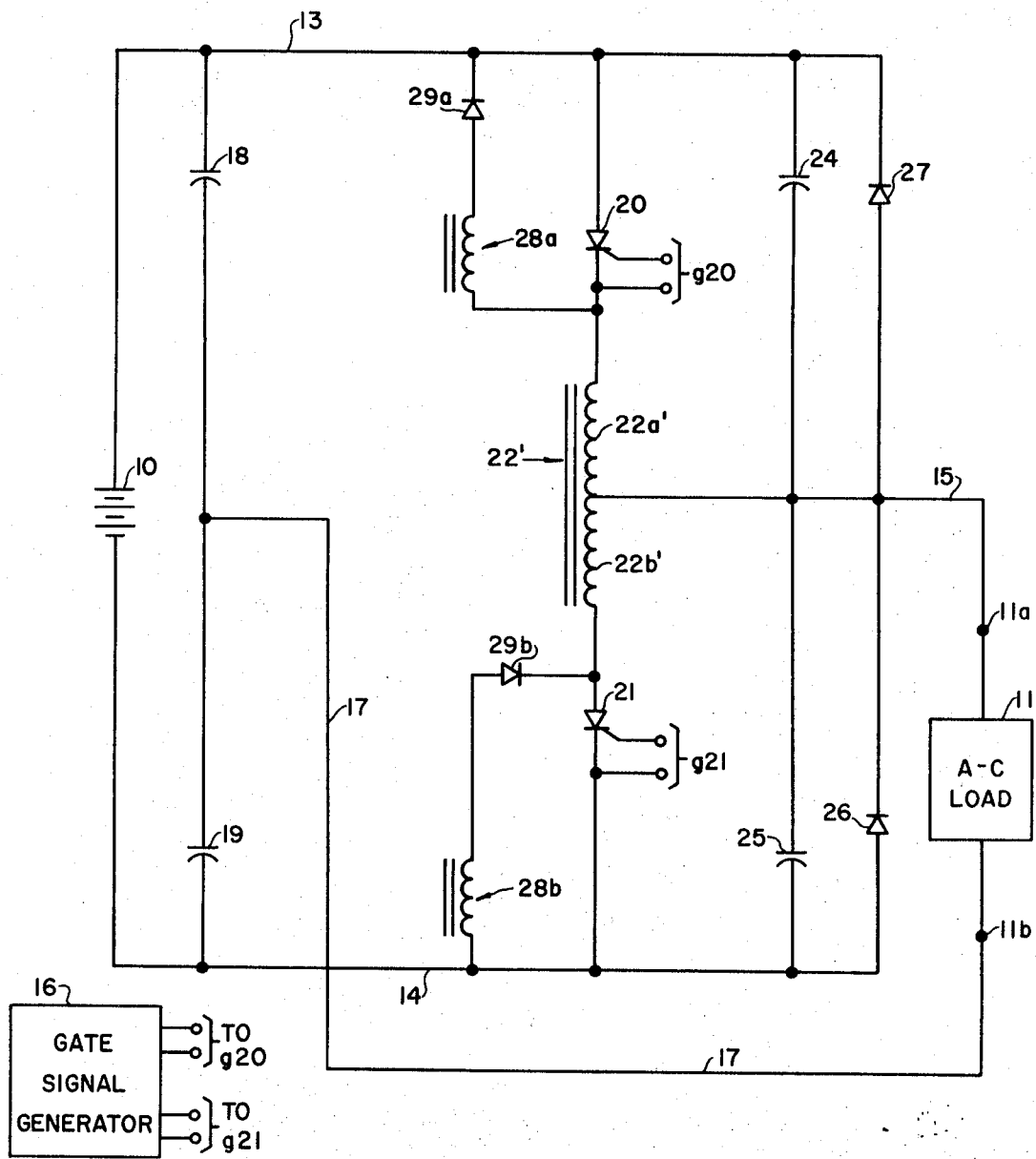
FIG. 2 is a schematic diagram of a modified circuit embodying the invention.

The circuit of FIG. 2 is similar to that of FIG. 1 and like functioning parts are, therefore, similarly numbered. Referring to FIG. 2 it will be seen that the windings of the commutating inductor are physically connected between thyristors 20 and 21 rather than between busses 13 and 14 and thyristors 20 and 21, respectively, as shown in FIG. 1. In the application of the present invention to the circuit of FIG. 2, the inductance means includes separate inductors 28a and 28b to obtain the desired advantages.

Electrically, however, the charge-discharge activity of the circuit of FIG. 2 is, in many respects, the same as that of the circuit of FIG. 1. When, for example, capacitor 25 is the discharging one of the commutating capacitors, the discharge loop includes capacitor 25, winding 22b' and the anode-cathode circuit of thyristor 21 while the charging loop includes capacitor 24, winding 22a', inductor 28a and diode 29a. Similarly, when capacitor 24 is the discharging one of the commutating capacitors, the discharge loop includes capacitor 24, the anode-cathode circuit of thyristor 20 and winding 22a' while the charging loop includes capacitor 25, inductor 28b, diode 29b and winding 22b'.

Figure 3:
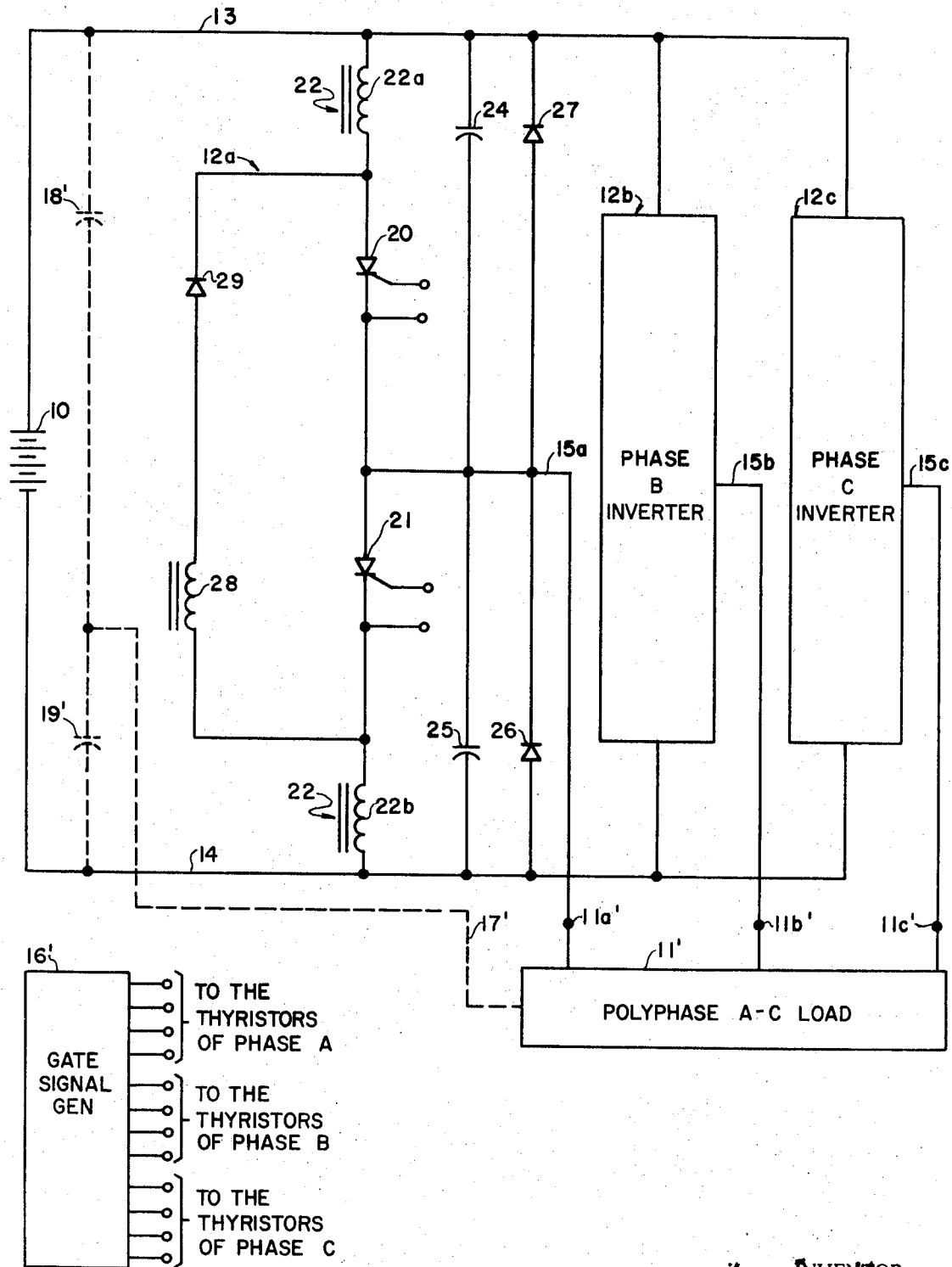
FIG. 3 is a schematic diagram of a polyphase circuit embodying the invention.

Referring to FIG. 3 there is shown a three phase inverter constructed in accordance with the invention. Since this polyphase inverter includes three single phase inverters 12A, 12B and 12C, each of which includes substantially the same circuitry, single phase inverters 12B and 12C are shown in block form. It will be understood that remarks made with respect to single phase inverters 12B and 12C are shown in block form. It will be understood that remarks made with respect to single phase inverter 12A apply with equal force to single phase inverters 12B and 12C if allowance is made for the operational phase differences stemming from the polyphase character of the circuitry.

Because current from the positive bus which flows through the upper portion of one single phase inverter can arrive at the negative bus by flowing through the load and the lower portions of the remaining single phase inverters, it will be seen that no neutral bus is necessary for the operation of the circuit of FIG. 3. A neutral bus may, however, be desirable if the AC load is unbalanced and connected in a WYE configuration. A neutral bus of this type is represented by conductor 17' which, together with a capacitance voltage divider including capacitors 18' and 19', is shown in dotted lines.

Single phase inverter 12A of FIG. 3 is the same as inverter 12 of FIG. 1 and like functioning parts are, therefore, given the same number. While single phase inverter 12A operates as part of a polyphase inverter in accordance with gating signals from a suitable gate signal generating circuit 16', the operation of inverter 12A with respect to charge-discharge activity of inductor 28 is the same as that described with reference to inverter 12 of FIG. 1. Accordingly, the description of the operation of the charge-discharge circuitry will not be repeated here.

From the foregoing, it will be seen that, in an inverter circuit constructed in accordance with the present invention, the energy stored in the discharging one of a plurality of commutating capacitors is given up as the discharging capacitor discharges in a discharge loop. It will further be seen that the energy given up by the discharging one of the commutating capacitors is received by the charging one of the commutating capacitors by means of current through an inductor in a charging loop.

It will be understood that the embodiments shown herein are for explanatory purposes only and may be changed or modified without departing from the spirit and scope of the invention.

What I claim is:

1. In an inverter in combination, a positive bus, a negative bus, an AC bus, load circuit means, first switch means for controlling the flow of current between said positive bus and said load circuit means through said AC bus, second switch means for controlling the flow of current between said negative bus and said load circuit means through said AC bus, a commutating transformer having first and second windings on a magnetic core, means for connecting said first and second switch means between said positive and negative busses through respective windings of said commutating transformer, first and second capacitance means, means for connecting said capacitance means in series between said positive and negative busses, means for connecting the junction of said capacitance means to said switch means, means for alternately and severally energizing said first an second switch means, a discharge inductor comprising a winding on another magnetic core, means for connecting the charged one of said capacitance means in closed circuit relationship with one of the windings of said commutating transformer and means for connecting the uncharged one of said capacitance means in closed circuit, current conducting relationship with the other of the windings of said commutating transformer and said discharge inductor.

2. In an inverter, in combination, a positive bus, a negative bus, an AC bus, load circuit means, first switch means for controlling the flow of current between said positive bus and said load circuit means through said AC bus, second switch means for controlling the flow of current between said negative bus and said load circuit means through said AC bus, first and second capacitance means, means for connecting said capacitance means in in series between said positive and negative busses, means for the the junction of said capacitance means to said switch means, a commutating transformer having first and second windings on a magnetic core, means for connecting said first and second switch means between said positive and negative busses through respective windings of said commutating transformer, alternatiely for alternately and severally energizing said first and second switch means, a discharge inductor comprising a winding on another magnetic core, a first discharge loop for conducting discharge current through said first winding and through said first switch said when said first capacitance means discharges. A first charging loop for conducting said current through said second and said discharge inductor when said second capacitance means when said first capacitance means discharges, a second discharge loop for conducting discharge current through said said second winding and said said second switch means when said second capacitance means discharges, a second charging loop for conducting charging current through said first winding, said discharge inductor and said first capacitance means when said second capacitance means discharges, said commutating transformer serving to transfer energy between said charging and discharge loops.

3. In an inverter, in combination, a positive bus, a negative bus, a neutral bus electrically between said positive and negative busses, first and second switch means each having power circuit means and control circuit means, a commutating transformer having first and second windings on one magnetic core, means for connecting said first and second switch means between said positive and negative busses through respective windings of said commutating transformer, load circuit means, means for connecting said load circuit means between said neutral bus and the power circuit means of said switch means, first and second commutating capacitance means, means for connecting said commutating capacitance means in series between said positive and negative busses, means for connecting the junction between said capacitance means to the power circuit means of said switch means, means for alternately and severally energizing the control circuit means of said first and second switch means, a discharge inductor comprising a winding on another magnetic core, said discharge inductor serving as means for transferring energy from the discharging one of said capacitance means to the charging one of said capacitance means, means for connecting said discharge inductor in closed circuit relationship with the charging one of said capacitance means through the conducting one of said switch means, unidirectional conducting means, means for connecting said unidirectional conducting means in series with said discharge inductor.

4. In an inverter, in combination, a positive bus, a negative bus, a neutral bus electrically between said positive and negative busses, first and second switch means each having power circuit means and control circuit means, load circuit means, a commutating transformer having first and second windings on a first magnetic core, means for connecting said first winding and the power circuit means of said first switch means in series between one end of said load circuit means and said positive bus, means for connecting said second winding and the poser circuit means of said second switch means in series between said one end of said load circuit means and said negative bus, means for connecting said load circuit means to said neutral bus, first and second commutating capacitance means, means for connecting said first and second commutating capacitance means in series between said positive bus and said negative bus, means for connecting the junction of said capacitance means to said switch means, means for alternately and severally energizing the control circuit means of said first and second switch means, a discharge inductor comprising a winding on a second magnetic core, means for connecting said discharge inductor across the power circuit means of said first and second switch means, unidirectional conducting means and means for connecting said unidirectional conducting means in series with said discharge inductor.

5. In an inverter, in combination, a positive bus, a negative bus, a plurality of single phase inverters, means for connecting each of said single phase inverters to said positive and negative busses; each of said single phase inverters including first and second switch means, a commutating transformer having first and second switch means between said positive and negative busses through said first and second windings, means for alternately and severally energizing said first an second switch means, first and second capacitance means, means for connecting said capacitance means in series between said positive and negative busses, means for connecting the junction of said capacitance means to said switch means, a discharge inductor for transferring energy from the discharging one of said capacitance means to the charging one of said capacitance means, said discharge inductor comprising a winding on another magnetic core, means for connecting one end of said discharge inductor to the junction between said first switch mean and said first winding, means for connecting the other end of said discharge inductor to the junction between said second switch means and said second winding, unidirectional conducting means, means for connecting said unidirectional conducting means in series with said discharge inductor; polyphase load means having a plurality of polyphase terminal means, means for connecting each of said polyphase terminal means to the first and second switch means of a respective single phase inverter.

6. In an inverter, in combination, a positive bus, a negativ bus, a neutral bus electrically between said positive and negative busses, first and second switch means, a commutating transformer having first and second coupled windings on a magnetic core, means for connecting said first switch means to said positive bus through said first winding, means for connecting said second switch means to said negative bus through said second winding, means for connecting said first and second switch means, load circuit means, means for connecting said load circuit means between said neutral bus and first and second switch means, means for alternately and severally energizing said switch means, first and second capacitance means, means for connecting said capacitance means in series between said positive and negative busses, means for connecting the junction of said capacitance means to said switch means, a discharge inductor, said discharge inductor comprising a winding on another magnetic core, means for connecting one end of said discharge inductor to the junction between said first switch means and said first winding, means for connecting the other end of said discharge inductor to the junction between said second switch means and said second winding, unidirectional conducting means, and means for connecting said unidirectional conducting means in series with said discharge inductor.

7. In an inverter, in combination a positive bus, a negative bus, a neutral bus electrically between said positive and negative busses, first and second switch means, a commutating transformer having a center-tapped winding on a magnetic core, means for connecting said center-tapped winding between said positive and negative busses through said first and second switch means, load circuit means, means for connecting said load circuit means between said neutral bus and the center-tap of said commutating transformer, first and second commutating capacitance means, means for connecting said first capacitance means between said positive bus and center tap of said commutating transformer, means for connecting said second capacitance means between said negative bus and the center-tap of said commutating transformer, means for alternately and severally energizing said first and second switch means, first and second discharge inductors, each of said discharge inductors comprising a winding on a respective magnetic core, means for connecting said first discharge inductor between said positive bus and the junction between said first switch means and said commutating transformer, means for connecting said second discharge inductor between said negative bus and the junction between said second switch means and said commutating transformer, unidirectional conducting means and means for connecting said unidirectional conducting means in series with said discharge inductors.

UNITED STATES PATENT OFFICE
CERTIFICATE OF CORRECTION

Patent No. 3,601,683    Dated August 24, 1971

Inventor(s) Harold J. Brown

It is certified that error appears in the above-identified patent and that said Letters Patent are hereby corrected as shown below:

Column 2, line 52, "are on the same core" should not be italicized.

Column 5, line 15, delete the following, "inverters 12B and 12C are shown in block form. It will be understood that remarks made with respect to single phase".

Claim 1, line 1, after "inverter" insert a comma.

Claim 1, line 15, change "an" to --and--.

Claim 2, line 8, delete "in", first occurrence.

Claim 2, line 9, change "the", first occurrence, to --connecting--.

Claim 2, line 14, change "alternatiely for alternatiely" to --means for alternately--.

Claim 2, line 18, change "said", third occurrence, to --means--.

Claim 2, line 19, change ". A" to --, a--.

Claim 2, line 20, change "and" to --winding,--.

Claim 2, line 20, change "said", first occurrence, to --charging--.

Claim 2, line 21, change "when", first occurrence, to --and--.

Claim 2, line 23, delete "said", first occurrence.

UNITED STATES PATENT OFFICE
CERTIFICATE OF CORRECTION

Patent No. 3,601,683      Dated August 24, 1971

Inventor(s) Harold J. Brown

It is certified that error appears in the above-identified patent and that said Letters Patent are hereby corrected as shown below:

Claim 2, line 24, change "said", first occurrence, to --through--.

Claim 4, line 9, change "poser" to --power--.

Claim 5, line 6, after "second" insert --windings on a magnetic core, means for connecting said first and second--.

Claim 5, line 8, change "an" to --and--.

Claim 6, line 1, change "negativ" to --negative--.

Claim 6, line 10, after "and" insert --said--.

Claim 7, line 1, after "combination" insert a comma.

Claim 7, line 12, change "center tap" to --center-tap--.

Signed and sealed this 17th day of October 1972.

(SEAL)
Attest:

EDWARD M. FLETCHER, JR.         ROBERT GOTTSCHALK
Attesting Officer               Commissioner of Patents